(12) United States Patent   (10) Patent No.: US 9,168,808 B2
Lindeman   (45) Date of Patent: Oct. 27, 2015

(54) CONTINUOUSLY VARIABLE DAMPER DEVICE

(75) Inventor: Eric Lindeman, Beuningen (NL)

(73) Assignee: Tractive Suspension B.V., Cuijk (NL)

( * ) Notice: Subject to any disclaimer, the term of this patent is extended or adjusted under 35 U.S.C. 154(b) by 338 days.

(21) Appl. No.: 13/988,729

(22) PCT Filed: Nov. 22, 2011

(86) PCT No.: PCT/NL2011/000076
§ 371 (c)(1),
(2), (4) Date: Jan. 14, 2014

(87) PCT Pub. No.: WO2012/070932
PCT Pub. Date: May 31, 2012

(65) Prior Publication Data
US 2014/0116825 A1    May 1, 2014

(30) Foreign Application Priority Data
Nov. 22, 2010  (NL) ...................................... 2005740

(51) Int. Cl.
*F16F 9/50* (2006.01)
*B60G 17/08* (2006.01)
*F16F 9/46* (2006.01)

(52) U.S. Cl.
CPC ................ *B60G 17/08* (2013.01); *F16F 9/464* (2013.01); *F16F 9/50* (2013.01)

(58) Field of Classification Search
CPC ............ B60G 17/08; F16F 9/34; F16F 9/465; F16F 9/53

USPC ...................... 188/266.2, 266.5, 267.2, 299.1
See application file for complete search history.

(56) References Cited

U.S. PATENT DOCUMENTS

| 4,974,707 | A | | 12/1990 | Neumann | |
|---|---|---|---|---|---|
| 5,409,089 | A | * | 4/1995 | Rapp et al. ................. | 188/266.5 |
| 5,690,195 | A | * | 11/1997 | Kruckemeyer et al. ..... | 188/282.5 |
| 6,131,709 | A | * | 10/2000 | Jolly et al. ................. | 188/267.2 |
| 8,485,224 | B2 | * | 7/2013 | Forster ...................... | 137/614.11 |

FOREIGN PATENT DOCUMENTS

| DE | 3922891 | 1/1991 |
|---|---|---|
| EP | 0122575 | 10/1984 |
| EP | 0399326 | 11/1990 |
| EP | 2236854 | 10/2010 |
| GB | 2227547 | 8/1990 |

\* cited by examiner

*Primary Examiner* — Christopher Schwartz
(74) *Attorney, Agent, or Firm* — Marcus C. Dawes; Daniel L. Dawes

(57) ABSTRACT

The present invention is related to a damper device (1). More in particular, the present invention is related to a damper device for which the damping force can be varied using a magnetically actuated closing member (33) with which a bypass channel (15) can be closed or opened. According to the present invention, the magnetic reluctance of the magnetic loop for guiding the magnetic field (8) is configured such that a too strong of an upward bending of the magnetic force versus closing member displacement curve is prevented. This prevents the system from obtaining multiple settling points for the closing member for a given current value. Consequently, the damper device is more stable and the damping force offered by it can be controlled more accurately.

32 Claims, 18 Drawing Sheets

CONTINUOUSLY VARIABLE DAMPER DEVICE

The present invention is related to a damper device. More in particular, the present invention is related to a damper device for which the damping force can be varied.

Such a damper device, as defined by the preamble of claim 1, is known from EP 2236854 A1.

The known damper device comprises a cylinder with a piston that separates the cylinder in a first and a second chamber. Passages in the piston allow hydraulic fluid to flow between the first and second chamber. The piston is connected to a piston rod. A bypass channel extends in the interior of the piston rod thereby connecting the first and second chamber. An internal valve member is connected to the piston rod inside the cylinder for at least partially opening or closing the bypass channel. The internal valve comprises a closing member, which is axially movable from a first extreme position to a second extreme position to open or close an opening of the bypass channel, and a spring which is connected to the closing member to generate a spring force to force the closing member into the first position. The valve member further comprises an electrical coil to generate a magnetic field for actuating the closing member to move against the spring force from the first position to the second position, and a guide member for guiding the generated magnetic field. A gap is provided in between the guide member and the closing member. A non-magnetic spacer is arranged in the gap and is connected to the closing member. Together, the guide member, closing member and gap form a substantially closed magnetic loop.

Using the known damper, shock absorbing can be realized in the following manner. Firstly, with the bypass channel fully closed, a high damping level is obtained as the piston is only allowed to move relative to the cylinder if hydraulic fluid flows through the narrow passages in the piston. By opening the bypass channel, this damping level can be lowered. As such, an adjustable damping level can be obtained.

It has been found that the damping force that can be realized by the known damper cannot be set accurately. Moreover, the known damper displays instabilities under certain operating conditions. A further disadvantage is that the known damper has a free flowing bypass that provides little to no damping at lower piston speed damping of the shock absorber in both compression and rebound direction. In order to achieve control over the low frequent vehicle body movements at least rebound movements should be slightly damped. Besides control over low frequency body movement, a minimum level of low piston speed damping is necessary for the driver to feel what is happening at the wheels of the vehicle.

The valve member in the known damper will open a free flowing communicating bypass parallel to the flow through the passages in the piston. The impact of the bypass on the flow of the hydraulic fluid, e.g. oil, will be identical for both directions of fluid flow. While compressing the damper, the characteristics of the damping force will benefit from a certain free flow of hydraulic fluid through the bypass. The free passage of bypass oil during compression will have a positive effect on absorbing high frequency wheel movements. However, while extending the shock absorber, the characteristics of the damping force will not benefit from the same free flow of hydraulic fluid through the bypass. It will not allow enough damping pressure to control a low frequent movement of the sprung mass of the vehicle.

The valve member inside the known damper will open a free flowing communicating bypass parallel to the flow through the passages in the piston when energized, i.e. when a significantly high current flows through the electrical coil. More than 90 percent of the time vehicles are being used at open, public roads. Drivers of these vehicles will most likely choose a comfortable set up for their suspension. In the case of the known damper, the comfortable setting of the suspension is achieved by driving the electrical coil in order to open the free flowing communicating bypass. Hence, energy consumption is rather high for the most common mode of operation.

It is an object of the invention to provide an improved damper device in which the abovementioned drawbacks do not occur, or at least to a lesser extent.

This object is achieved with a damper device according to claim 1, which is characterized in that the magnetic loop has a first magnetic reluctance attributed to the first gap and a second magnetic reluctance attributed to a remainder of the magnetic loop, wherein the magnetic loop is configured such that the second magnetic reluctance increases at least during part of the movement of the closing member towards the guide member.

It has been found that the known damper has the potential to become instable under certain operating conditions. After careful study, it was found that these instabilities occur due to the characteristics of the magnetic field versus the position of the closing member. An example of these characteristics is illustrated in FIG. 1. In this figure, the magnetic force on the closing member in Newton is depicted versus the position of the closing member in millimeters for three current values of the current through the electrical coil. Here, a position of 2 mm corresponds to a fully open bypass channel, whereas a position of 0 mm corresponds to a fully closed bypass channel. In the same figure, a curve is shown illustrating the spring force exerted on the closing member by the spring. A balance is achieved when the spring force is equal to the magnetic force.

As can be seen from FIG. 1, for some current values, more than one point can be identified on a single curve for which this balance occurs. This means that the piston displays instable behaviour. During normal use, a damper experiences vibrations as a result of which the damper may move between different points at which the spring force is equal to the magnetic force.

A further examination of FIG. 1 shows that the problem of multiple intersecting points on the spring force curve and magnetic force curve is related to the strong upward tendency of the magnetic force curves at high values for the closing member position. These positions correspond to situations in which the gap between the closing member and the guide member is very small. Due to these small gaps, the magnetic reluctance of the magnetic loop drastically reduces, allowing very high magnetic fields to be generated. In general, the magnetic field increases more than linearly with the position of the closing member, whereas the spring force curve is approximately linear. Consequently, for some current values multiple intersection points are possible.

The strength of the magnetic field that is generated by the coil unit depends on the magnetic reluctance of the magnetic loop. The reluctance has a part that can be attributed to the gap, where the magnetic permeability is low and the reluctance high, and another part that can be attributed to the remainder of the loop, comprising the closing member and the guide member. This latter part normally has a low reluctance as the materials used for the closing member and guide member have a high magnetic permeability.

According to the present invention, the problem of instabilities of the damper device can be solved if the magnetic loop is such that the magnetic reluctance of the remainder of the magnetic loop increases at least during part of the movement of the closing member towards the guide member. Here, it is noted that the increase in magnetic reluctance normally is needed when the closing member is near or at the point where the closing member touches or abuts the guide member. The increase in reluctance partly compensates the decrease in reluctance caused by decreasing a gap length. Consequently, magnetic force and spring force curves can be obtained as illustrated in FIG. 2. From this figure it is clear that the curves corresponding to the magnetic force do not show the upward bending as the corresponding curves in FIG. 1 do. Consequently, a single intersection point can be identified for each current level. Compared to the known damper, the damper device according to the present invention has a better control of the positioning of the closing member and therefore of the damping force offered by the damping device.

In general, it could be stated that the increased angle between the magnetic force curve and the spring force curve determines the stability and the accuracy of the equilibrium point, i.e. the intersection point. A relatively high magnetic force when the gap is large combined with a relatively low magnetic force when the gap is small, though higher than that for large gaps, improves the stability of equilibrium state.

In an embodiment, the increase in magnetic reluctance of the remainder of the magnetic loop is achieved by the magnetic loop comprising a further gap between the closing member and the guide member. This further gap increases at least during part of the movement of the closing member towards the guide member. In a further embodiment, the closing member has a tapered form in the first direction. The further gap is then formed in a direction perpendicular to the first direction. Due to the tapered form, the further gap increases when the closing member moves towards the guide member. Because of the increase in air gap, magnetic reluctance will rise.

In another or further embodiment, the increase in magnetic reluctance can be obtained if the magnetic loop is configured to magnetically saturate at least during part of the movement of the closing member towards the guide member. Here, magnetic saturation should be interpreted as the phenomenon that magnetic induction does no longer increase proportional to the magnetic field. This process can be described by lowering of the effective magnetic permeability. As the magnetic reluctance is inversely proportional to the magnetic permeability, magnetic reluctance will increase due to magnetic saturation.

In an embodiment, the closing member just reaches a first position relative to the guide member when, during operation, a current through the coil unit equals a predefined minimum level, and wherein the closing member and the guide member each have an end region adjacent the first gap. The end region of the closing member and/or the guide member has an arcuate or pointed shape such that during operation the end region displays magnetic saturation when the closing member is near or at the first position and the current level is near or at the predefined minimum level. In a further embodiment, the first position corresponds to a position in which the closing member and guide member are abutted via the non-magnetic spacer.

By shaping the end regions of the closing member and/or guide member two effects are obtained. Firstly, the effective cross section of the end region for magnetic fields, when measured in the radial direction, is lowered, thereby increasing the magnetic reluctance. Secondly, higher magnetic fields will exist in the end regions, thereby accelerating the process of magnetic saturation.

The skilled person will understand that both measures described above, i.e. increase a further gap and induce magnetic saturation, can be applied simultaneously or individually.

In an embodiment, the spring constant of the spring device and a magnetic permeability of the magnetic loop are configured such that the spring force acting on the closing member at or near the first position roughly compensates the magnetic force acting on the closing member when the current is at said predefined minimum level.

In order to be able to quickly set a desired damping level, the closing member needs to quickly react to a new current setting of the current through the coil unit. To that end, the closing member itself needs to have a low mass. Furthermore, the forces that can be exerted on the closing member should be high. Consequently, both the spring constant and the magnetic properties of the loop should allow this. This can be achieved by choosing a spring with a sufficiently high spring constant and magnetic material with a sufficiently high magnetic permeability.

In an embodiment, the end region of the closing member and the end region of the guide member define a pair for which one end region has an arcuate protrusion and another end region a corresponding arcuate indentation, or one end region has a pointed structure and another end region a V-shaped groove suitable for at least partly receiving the pointed structure, or one end region has a first needle like shape and another end region a second needle like shape placed offset to the first needle like shape allowing the end regions to at least partly pass each other when moving to the first position. The skilled person would understand that multiple other configurations are possible that comprise a suitable shape to promote magnetic saturation to occur due to field crowding. By having complementary shapes of the relevant end regions, symmetric behaviour can be obtained. Moreover, complementary shapes are more tolerant with respect to mutual displacement of the closing member and guide member.

In an embodiment, the shape of the end regions is such that a shortest distance between the end regions is significantly smaller than a smallest distance between the end regions in the first direction. The distance in the first direction is related to the mechanical translation or movement of the closing member, i.e. the distance that needs to be crossed to allow the bypass channel to be opened and closed. The shortest distance however, is the distance that is relevant for the magnetic reluctance and thus for the magnetic field strength that can be generated by the coil unit. By configuring the shape of the end regions such that these distances differ greatly, higher magnetic fields can be achieved at similar distances measured along the first direction. As mentioned before, higher magnetic fields allow the closing member to react more quickly. Of course, a suitable spring device must be used.

In an embodiment, the cylinder comprises a main elongated chamber in which the piston is arranged. The main chamber has a wall provided with a first and second opening, which are connected to the first and second chamber, respectively. In this case, the bypass channel is formed as an auxiliary elongated chamber preferably extending in parallel to the main chamber and connecting the first and second opening. The auxiliary chamber could be in the form of a small tube connected to the main chamber wall.

In a further embodiment, the bypass channel is at least partly formed by an auxiliary pipe member fixedly connected to the first or second opening and extending in the auxiliary chamber.

In an alternative embodiment, the bypass channel is formed as a channel extending through the piston. In a further embodiment, the bypass channel is at least partly formed by a pipe member fixedly connected to or integrally formed with the piston and extending in an axial direction parallel to a longitudinal axis of the cylinder. The pipe member may be provided with a through hole, preferably a radial through hole, which enables fluid communication with the first chamber. In an embodiment, multiple through holes are arranged along the circumference of the pipe member.

In a further embodiment, the closing member comprises a sleeve arranged inside the pipe member or the auxiliary pipe member. In this case, the damper device further comprises an axially elongated spring guide for guiding the spring device to place the closing member under spring bias. In a different further embodiment, the closing member comprises a sleeve arranged around the pipe member or the auxiliary pipe member.

If the closing member is in the form of a sleeve that slides telescopically with respect to the pipe member or the auxiliary pipe member, for instance by sliding over the pipe member or the auxiliary pipe member, in a direction perpendicular to the through holes, it is possible to obtain a symmetric loading of the sleeve by the hydraulic fluid flowing through the through holes. It is also possible that radial through holes are provided in the sleeve. In such case, opening of the bypass channel involves aligning the holes in the sleeve and the through holes in the pipe member. If the through holes are distributed evenly around the circumference of the pipe member, a symmetric force will be applied to the closing member. A situation can thereby be avoided in which the sleeve is pressed to the pipe member unilaterally, thereby increasing the frictional resistance between the pipe member and the closing member.

In a further embodiment, the pipe member is fixedly connected to or forms part of a piston rod. In an even further embodiment, the pipe member is connected to an end of the piston rod. The piston may comprise a channel for carrying electrical wiring for said coil unit.

In an embodiment, an opening or a plurality of openings of the bypass channel and/or the closing member that is to cooperate with the closing member and/or bypass channel, respectively, to obtain a variable damping force, is shaped or distributed such that a damping force offered by the damper device during use is a predefined function, and preferably a substantially linear function, of a current through the coil unit. Here, an opening or a plurality of openings refers to the opening(s) of the bypass channel to the first chamber or to the opening(s) in the closing member which can be brought in line with one or more openings of the bypass channel to open the bypass channel. This opening or these openings can be covered partially or fully by the closing member. By varying the effective opening of the bypass channel, the flow resistance versus position of the closing member characteristics can be modified. In turn, the position of the closing member depends on the balance between magnetic force and spring force. Hence, for a given current sweep, the resulting positions of the closing member can be predicted. By stating that the damping force of the damper device should be proportional to the current level, a desired flow resistance can be computed for each current level. From the computed flow resistance an effective opening can be calculated. This effective opening can be realized as a single opening with a varying shape in the first direction or a plurality of openings for which the density varies in the first direction although the openings are preferably distributed evenly in a direction perpendicular to the first direction. An example is the distribution of openings along the circumference of the abovementioned pipe member, the auxiliary pipe member, and/or closing member. This distribution is even but the density of openings varies in the first direction. For instance, for a given position of the closing member, a row of 10 openings may be covered by the closing member, whereas a slight displacement upwards may result in the additional covering of a row with 12 openings, all distributed evenly along the circumference of the pipe member or auxiliary pipe member. To prevent dead points in the characteristics where a motion of the closing member in the first direction would not result in a different flow resistance, the distribution of openings may be staggered.

In an embodiment, the coil unit comprises a solenoid. This does not exclude the use of other geometries or coils. Neither is a combination of multiple coils excluded or a combination of a permanent magnet and electrical coil.

In a further embodiment, the solenoid is essentially cylindrically shaped having a longitudinal axis extending along the first direction. The closing member and guide member can be configured such that the first gap is located approximately halfway of the solenoid in the first direction. It has been found that this position enables high magnetic field strengths to be achieved when compared to other positions of the gap.

The present invention allows the damper device to be configured such that the closing member fully opens the bypass channel when the coil unit is sufficiently driven, i.e. using relatively high currents. Such a system allows relatively low damping levels at high currents. However, as most dampers are used in vehicles under conditions where a high comfort level is important, it is more energy efficient if the closing member closes the bypass channel when the coil unit is sufficiently driven.

In a further embodiment, measures are taken to prevent that under emergency conditions, when there is no current or voltage supply available, the bypass channel is fully opened. In such conditions, it is normally required or desired to have more damping as the vehicle may be in an extreme situation. To that end, the spring device may comprise a first spring having a lower spring constant, e.g. a wave spring, and a second spring having a higher spring constant thereby obtaining a knee point in the force-distance characteristics of the spring device. This knee point can be made to correspond to a position of the closing member in which the fluid passage is fully open. The closing member and spring device can be configured such that when the coil unit is not driven, the closing member partially closes the fluid passage due to the spring bias. This allows some damping under extreme conditions. To move the closing member to the position corresponding to the knee point a moderate current level is needed due to the lower spring constant. However, when moving beyond that point, i.e. where the closing member starts to partially close the bypass channel, more current is needed because in that region the spring with the higher spring constant becomes dominant.

This failsafe mechanism also works with a single spring with a single spring constant. However, such a system would always require a relatively high current level when the bypass channel needs to be fully opened.

In an embodiment wherein the closing member is arranged in the pipe member or auxiliary pipe member, the first spring may be fixedly mounted with respect to the pipe member, and the second spring may be coupled to the spring guide. It is advantageous if the spring guide is moveable in an axial direction with respect to the pipe member or the auxiliary pipe member to adjust the knee point. The spring guide could for instance be mounted to a housing of the valve using a threaded connection which allows the spring guide to move in an axial direction by rotating the spring guide using a tool.

In an embodiment, the piston comprises a further bypass channel for fluid communication between the first and second chamber having a flow resistance which is significantly higher than that of the opened bypass channel. Hence, when the bypass channel is fully closed, the damping is determined by the further bypass channel. When the bypass channel is partially or fully opened, the damping is mainly determined by the bypass channel. Such configuration can be achieved by having a relatively large cross section for the bypass channel and a relatively small cross section for the further bypass channel.

The damping behaviour depends on the speed at which the piston moves relative to the cylinder. When a vehicle travels over even terrain, or where the vehicle travels very slowly, the piston does not need to move very fast in order to absorb shocks. In these circumstances, the influence of the bypass channel is negligible. However, when the vehicle travels fast and/or the terrain is rough, quick reaction of the piston and high absorption is required. Under such circumstances, even the relatively large cross section of the bypass channel has a significant contribution to the damping action. The point at which the damping behaviour switches between these types of behaviour can be set by varying the opening of the bypass channel with the closing member. Still, at low speeds or on smooth terrain it may be desirable to achieve more damping.

To meet this need, the damper device may comprise a restriction device arranged in between the bypass channel and the first or second chamber. The restriction device has a flow resistance that is significantly higher than that of the opened bypass channel. This allows damping even under very moderate conditions.

In an embodiment, the restriction device comprises a restriction channel and an elastically deformable closure connected to an end of the restriction channel. The closure is configured to at least partially open the restriction channel when fluid flows in a first restriction direction through the restriction channel towards the closure corresponding to movement of the piston in a first piston direction, and to close the restriction channel when fluid flows in a direction opposite to the first restriction direction corresponding to movement of the piston in a second piston direction opposite to the first piston direction. Such a restriction device allows the damping to be different depending on the type of stroke of the cylinder. In one direction, the restriction device determines the damping, whereas in the other direction, the damping is determined by the further bypass channels in the piston as the restriction channel is blocked. The restriction depends on the movement of the piston, e.g. a rebound or compression stroke. During one of these movements the restriction channel is closed whereas during the other movement it is at least partially opened.

In a further embodiment, the closure is configured to bend away or to be pushed away by the fluid when the fluid flows in the first restriction direction through the restriction channel towards the closure.

In an even further embodiment, the restriction device comprises a further restriction channel and a further elastically deformable closure connected to an end of the further restriction channel. Also here, the further closure is configured to at least partially open the further restriction channel when fluid flows in a second restriction direction through the further restriction channel towards the further closure corresponding to movement of the piston in the second piston direction, and to close the further restriction channel when fluid flows in a direction opposite to the second restriction direction corresponding to movement of the piston in the first piston direction.

In a further embodiment, the further closure is configured to bend away or to be pushed away by the fluid when the fluid flows in the second restriction direction through the further restriction channel towards the further closure. In an embodiment, the first and second restriction directions are opposite directions.

The restriction channels allow the restriction device to determine the damping level in both directions of movement of the piston.

In a further embodiment, the restriction device comprises an element, such as a spacer, to tension and/or preload the closure or further closure in a direction towards the restriction channel or further restriction channel, respectively. The spacer, or other means to tension and/or preload the closure, allows the deformation behaviour of the closure to be changed. For instance, prior to use, the spacer may be replaced by a different spacer that preloads the closure differently. As a result, the elastic deformation of the closure under a similar hydraulic pressure will be different. Consequently, the flow resistance of the restriction device will be changed thereby offering more or less damping at low speeds and/or smooth terrain.

The restriction device can be incorporated in the valve member or it can be connected to the bypass channel within the second chamber.

Next, the invention will be described in more detail with reference to the accompanying drawings, wherein.

Figure 3:
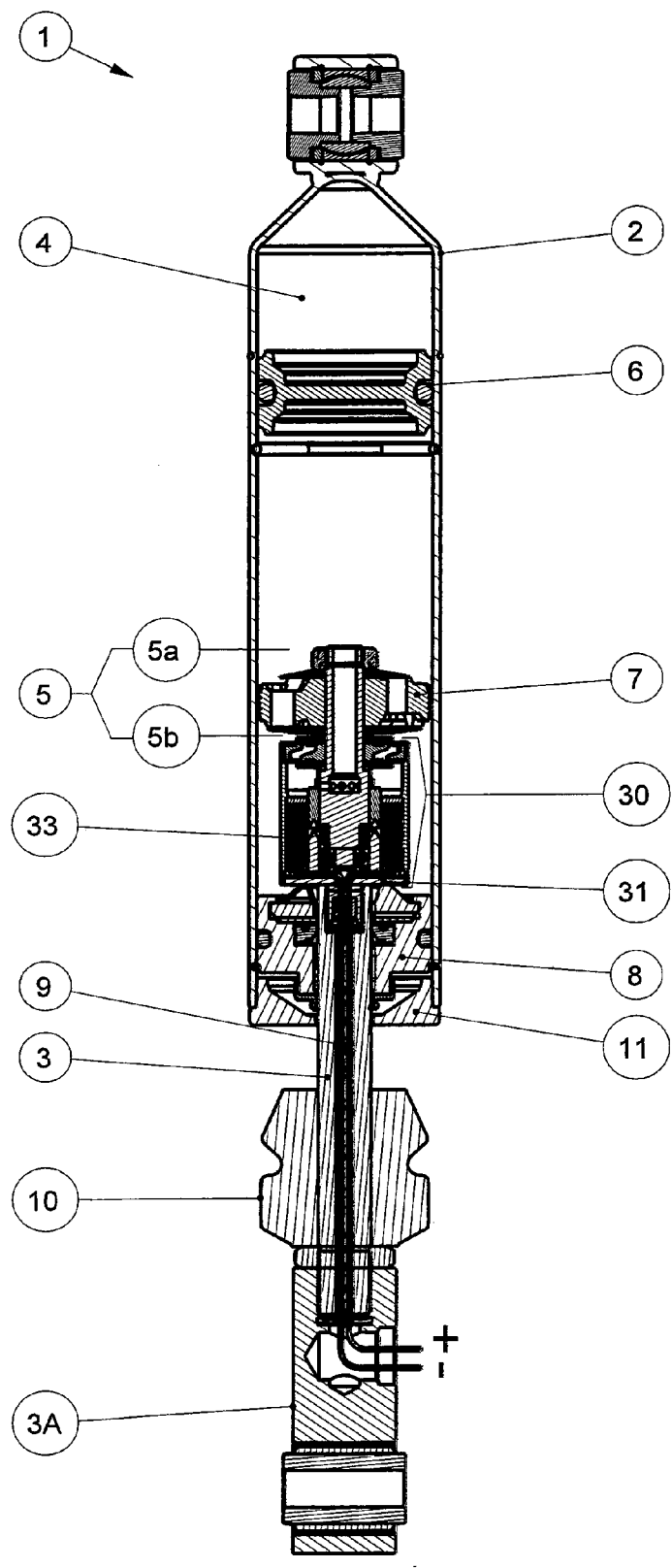
FIG. 3 is a cross section of an embodiment of the damper device according to the present invention.
Figure 7A:
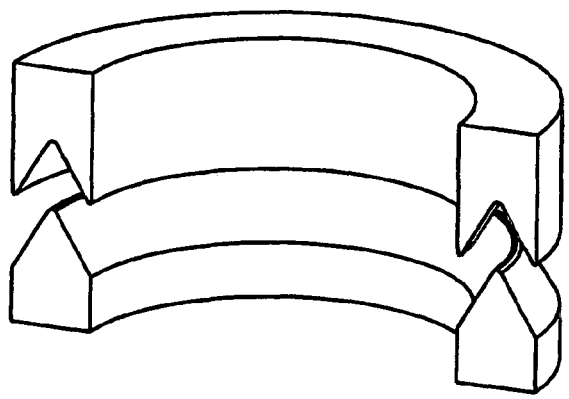
Figure 7B:
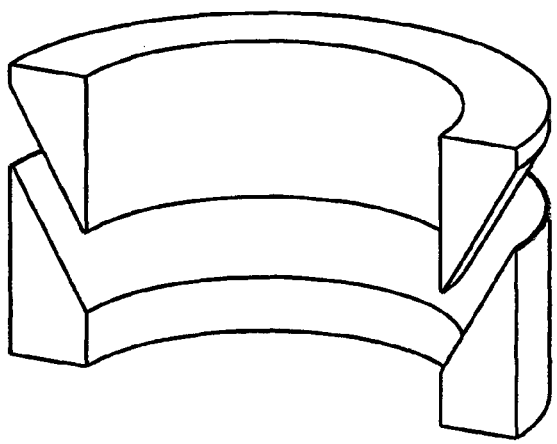
Figure 7C:
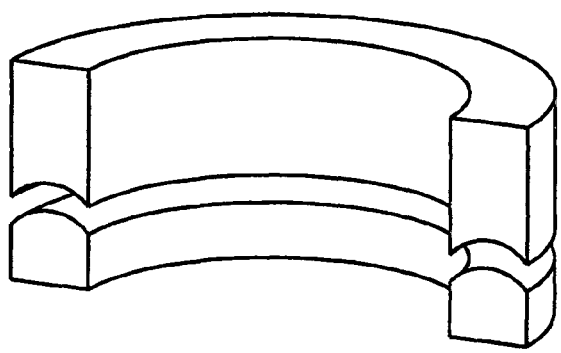
Figure 8:
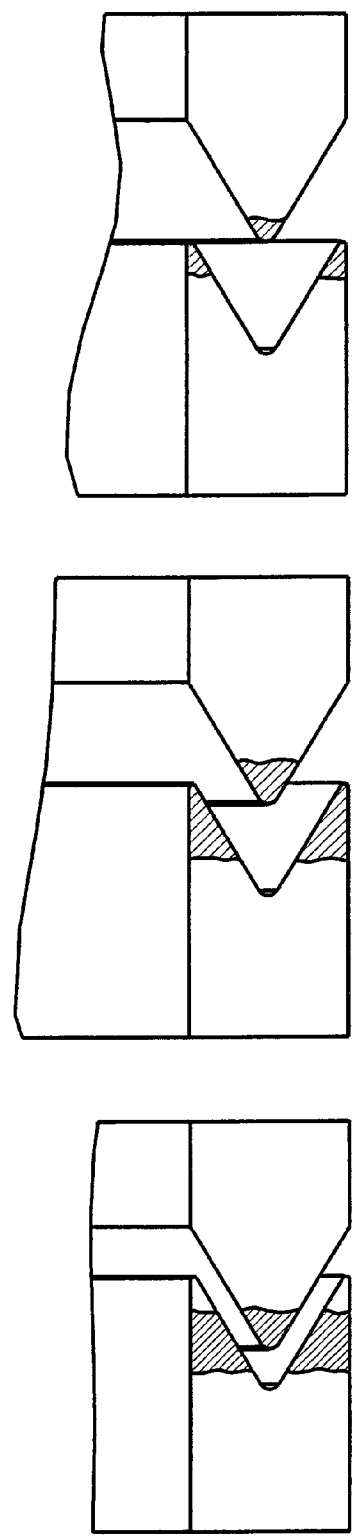
Figure 9A:
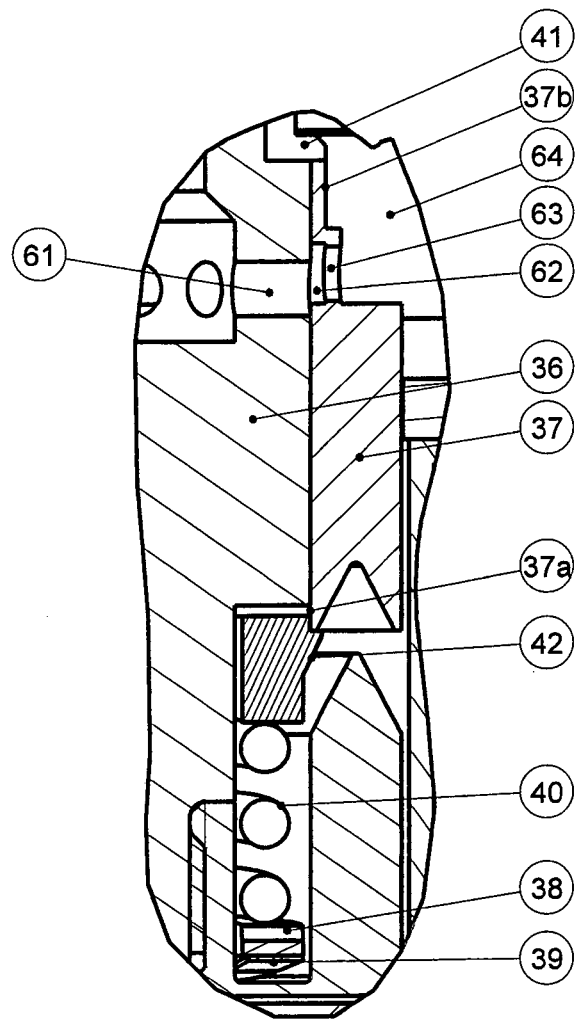
Figure 9B:
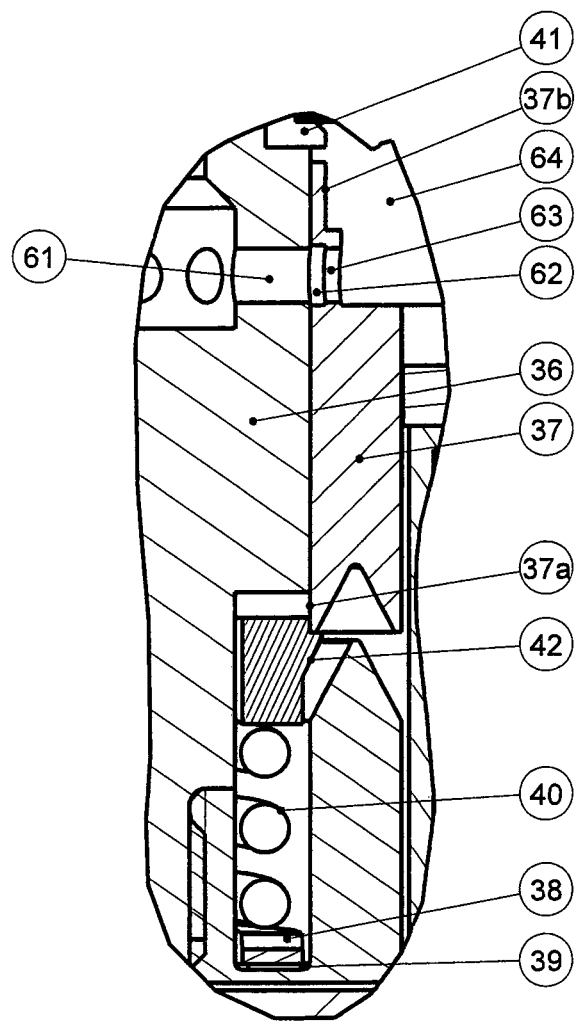
Figure 10A:
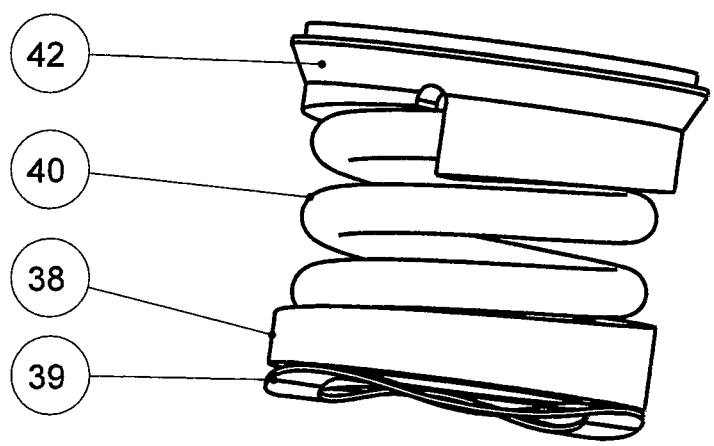
Figure 10B:
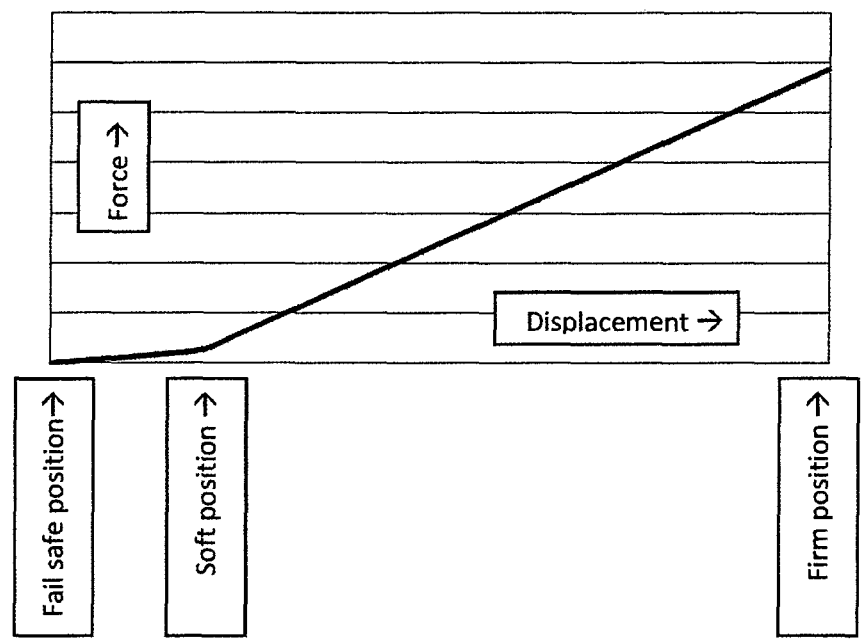
Figure 11A:
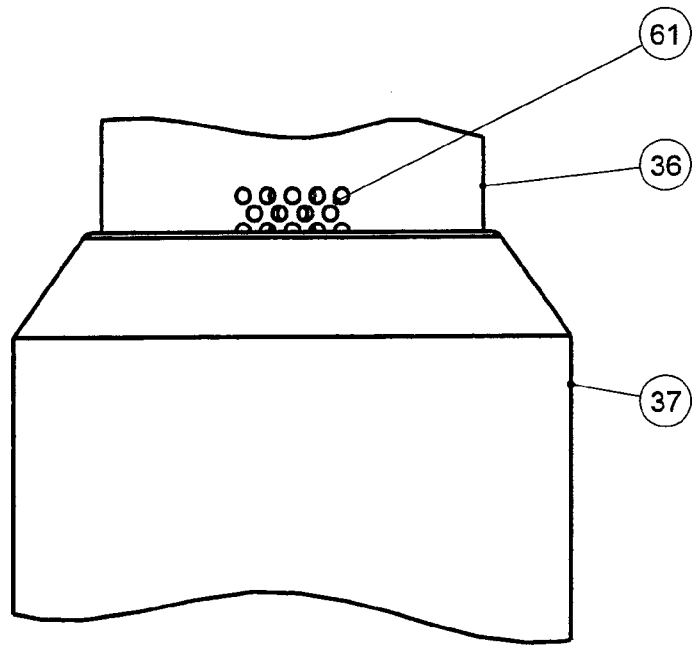
Figure 11B:
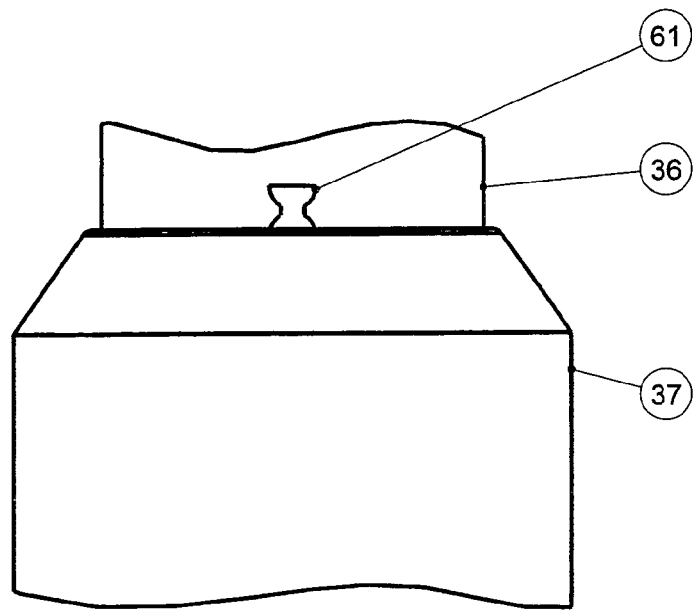
Figure 12A:
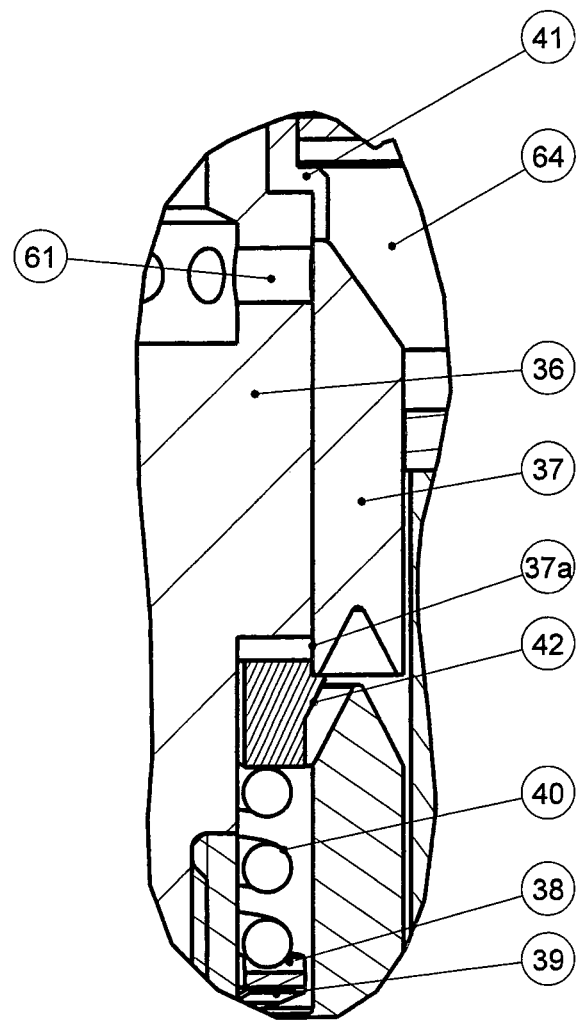
Figure 12B:
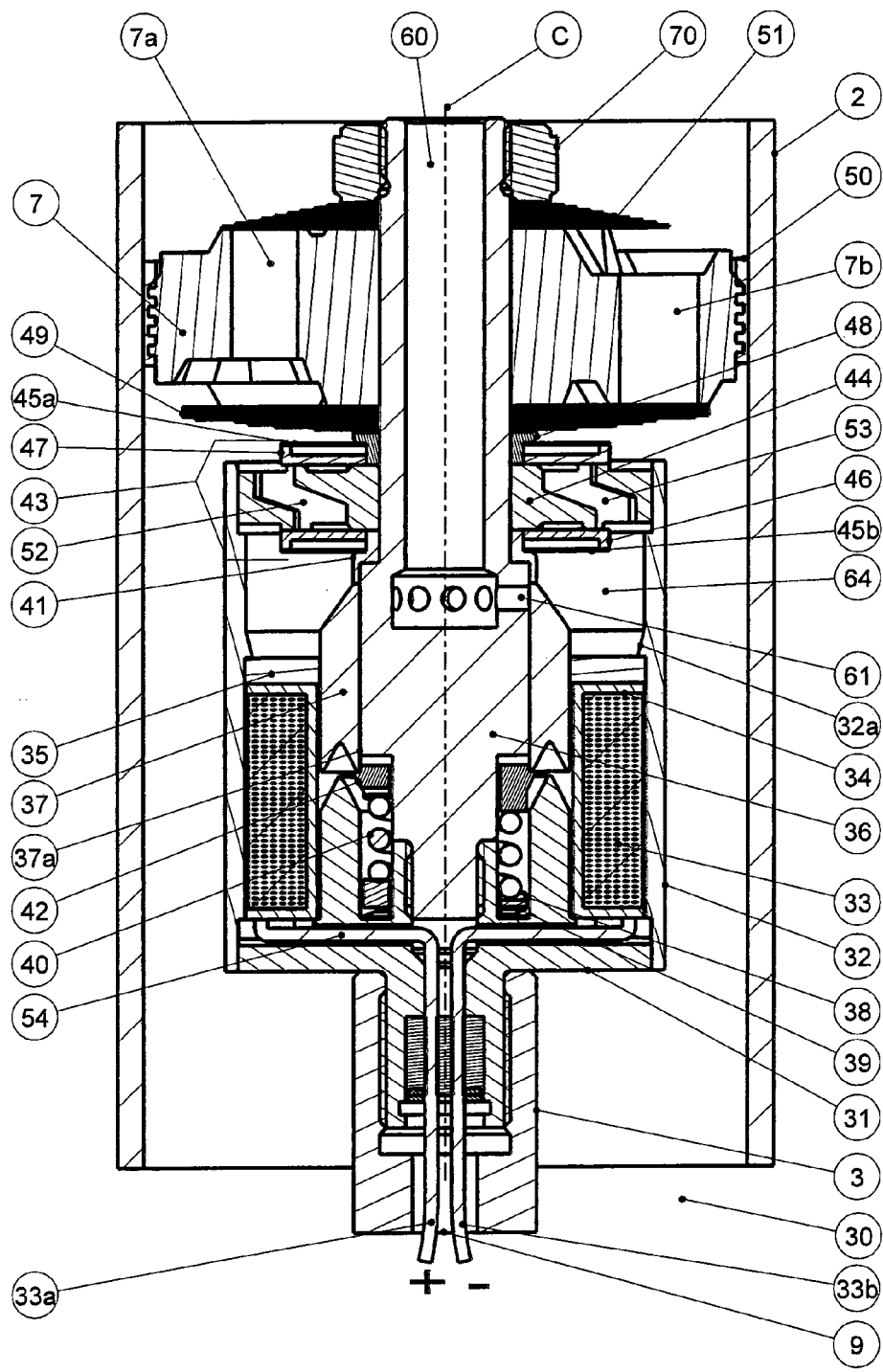
Figure 13:
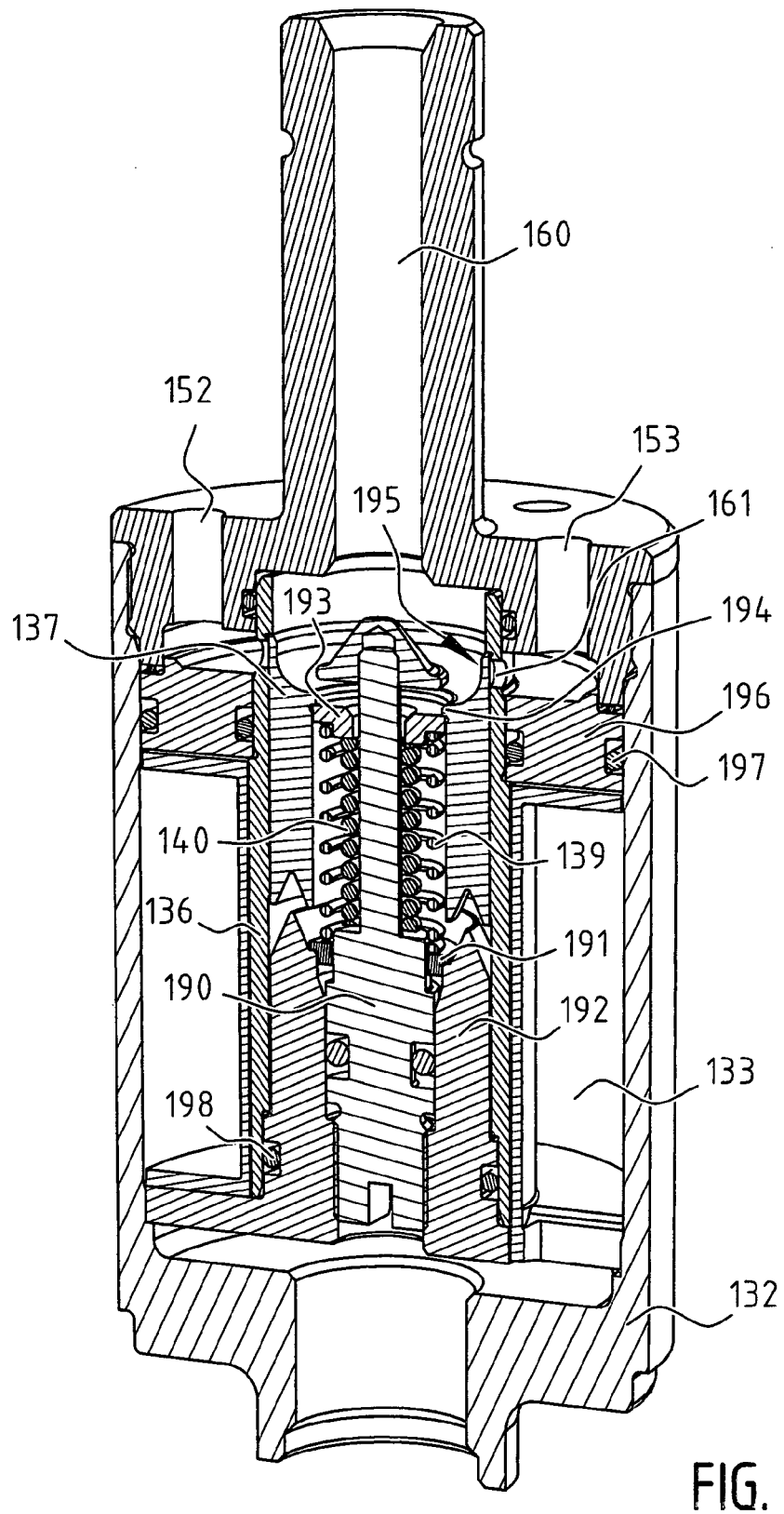

FIGS. 7A-7C present different shapes of the end regions of the closing member and guide member according to the invention;

FIG. 8 illustrates the magnetic saturation in the end regions of the closing member and guide member in the damper device of FIG. 3;

FIGS. 9A and 9B show an embodiment of a failsafe mechanism for the damper device of FIG. 3;

FIGS. 10A and 10B illustrate a spring device used in the failsafe mechanism of FIG. 9A and the corresponding spring-force characteristics;

FIGS. 11A and 11B show possible configurations of openings in the pipe member of the embodiment in FIG. 3 allowing more linear or otherwise desired current-damping force characteristics;

FIGS. 12A and 12B illustrate an embodiment in which the valve closes when de-energized and opens when energized; and FIG. 13 shows a different embodiment of a valve member in accordance with the present invention.

FIG. 3 illustrates an embodiment of a damper device or shock absorber 1 according to the invention. Hydraulic shock absorber 1 is interposed between the body side of a vehicle and the wheel side of the vehicle and is provided with a cylinder 2 to be connected to the body side and a piston rod 3 to be connected to the wheel side. To that end, piston rod 3 comprises a mounting eye 3a projecting out of the lower end of cylinder 2. Hydraulic shock absorber 1 could also be mounted in a sense contrary to that above i.e. in such a sense that cylinder 2 is connected to the wheel side and the piston rod 3 to the body side.

A freely movable separation piston 6, which partitions cylinder 2 into a high pressure gas chamber 4 and an oil chamber 5, is fitted in cylinder 2 for sliding along a longitudinal axis of cylinder 2. High pressure gas chamber 4 is filled with high pressure gas and oil chamber 5 is filled with oil as hydraulic shock absorber working fluid.

Oil chamber 5 is partitioned into an upper or second oil chamber 5a and a lower or first oil chamber 5b by a throttled piston 7 installed on the cylinder side end of piston rod 3.

Piston rod 3 is movably mounted with respect to cylinder 2 and is constructed with a hollow shaft 9 penetrating the lower end rod guide—rebound bumper—and seal unit retainer 8, which can be formed as a single component.

The movement of piston rod 3 is limited by a compression stop rubber 10 touching a cylinder end cap 11. Hollow shaft 9 of piston rod 3 is used for guidance of electrical wires connected to a coil 33 of a solenoid, see FIG. 4. The side of piston rod 3 penetrating through lower end rod guide—rebound bumper—and seal unit retainer 8 is connected to a valve member 30, which is described next in conjunction with FIGS. 4A, 4B, 5, 6A, and 6B.

Valve member comprises a valve base 31, which is connected to piston rod 3. It further comprises a piston post-valve slider guide 36 connected by means of a threaded bond inside piston rod 3. Piston post-slider guide 36 is made out of non-magnetic material like aluminium or stainless steel and has multiple functions in this embodiment.

Figure 4A:
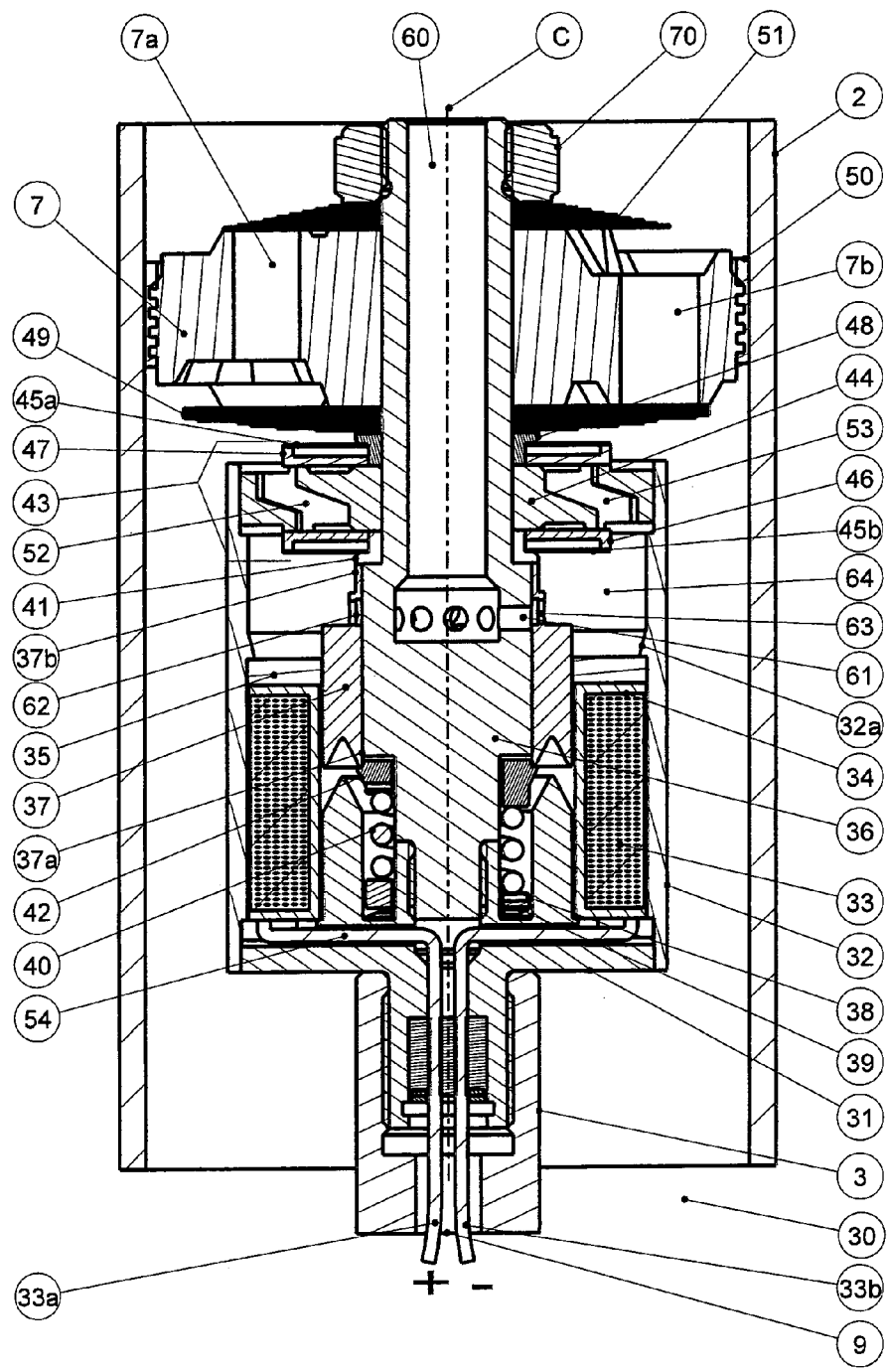
FIGS. 4A and 4B are an enlarged sectional view of the valve member of the damper device of FIG. 3 wherein the bypass channel is fully opened in 4A or closed in 4B, respectively.
Figure 6A:
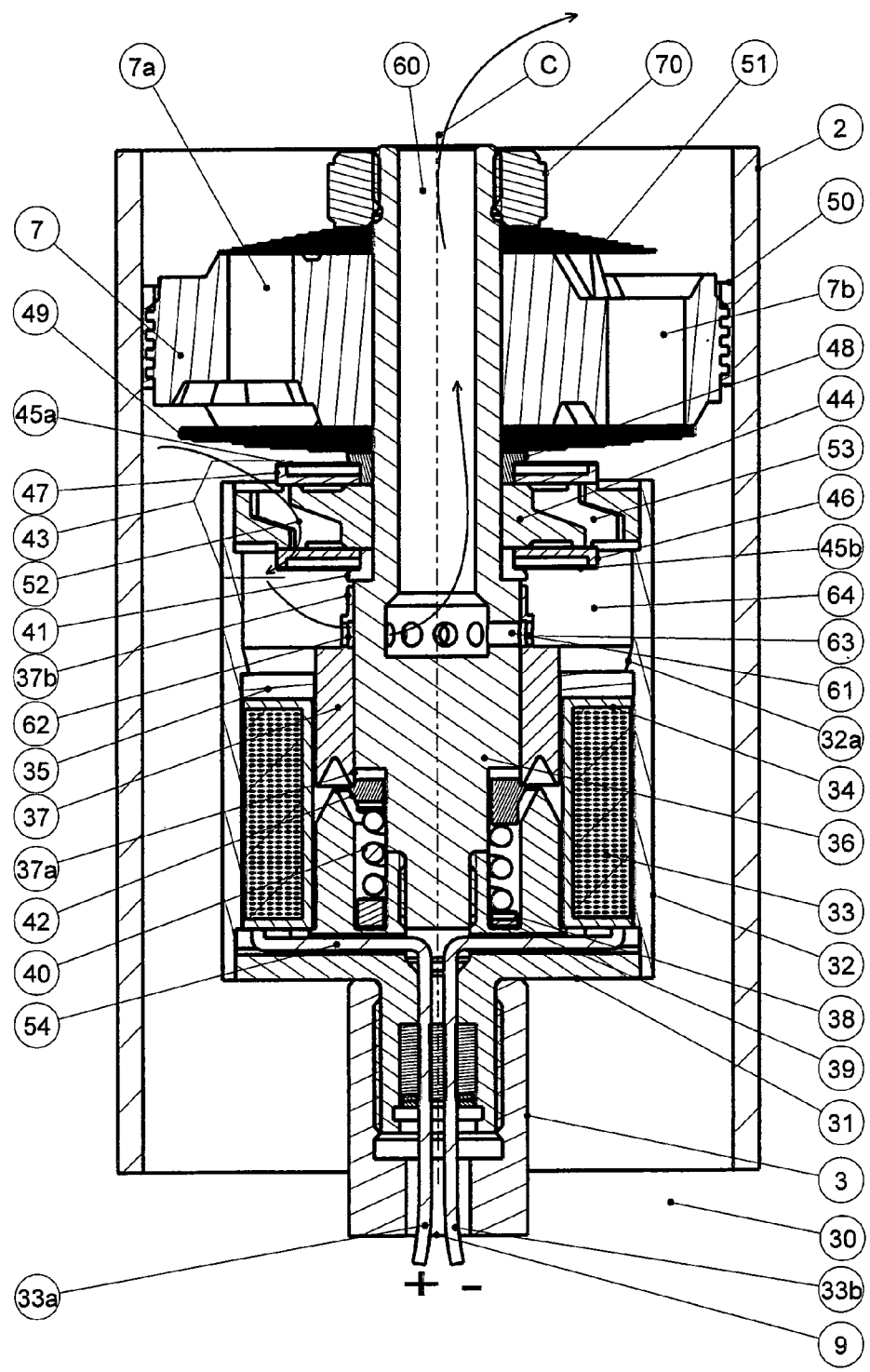
FIGS. 6A and 6B illustrate how the oil moves inside the rebound bypass flow throttle and compression bypass flow throttle of the damper device of FIG. 4 during a rebound and compression stroke, respectively.
Figure 6B:
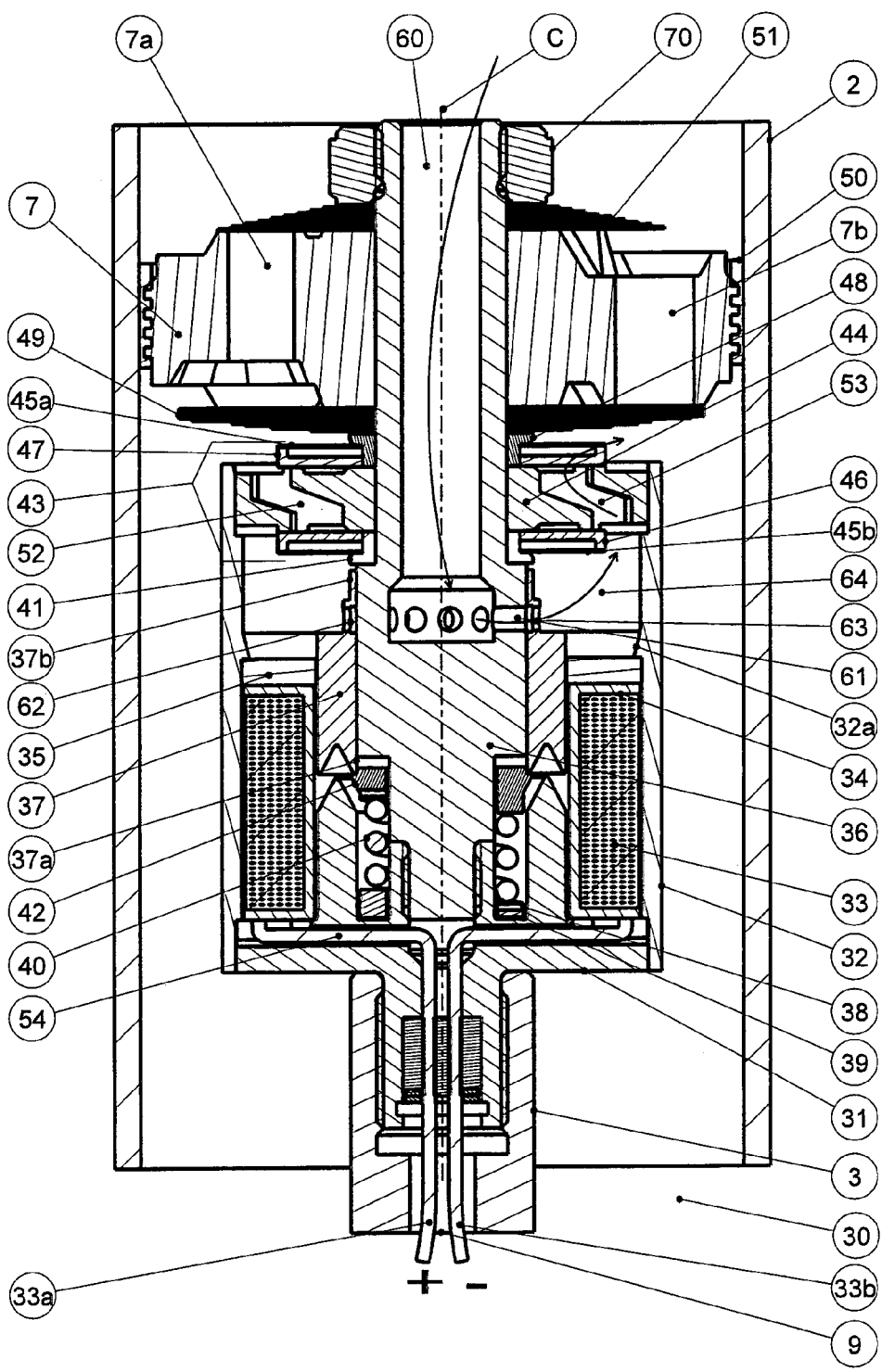

A radial hole 54 is drilled through valve base 31 and piston post-slider guide 36 towards hollow shaft 9 to guide the wires for electrical connection of coil 33 of the solenoid. Coil 33 rests on valve base 31 and can be either wound around a cylindrical part with flanges, such as bobbin 34 shown in FIGS. 4A and 6A. However, coil 33 may also be of a thermo bond type without the support of a cylindrical part with flanges. A disk like spacer 35 is placed on top of bobbin 34. A valve housing 32 is connected to the outer diameter of valve base 31, either by means of a threaded bond as shown in FIG. 6A or using a locked seam at the bottom end of valve housing 32. Inside valve housing 32, disk like spacer 35 rests against an inner valve housing edge 32a. Inner valve housing edge 32a, configured to support disk like spacer 35, can be machined as shown in FIG. 4A, or it may be constructed by means of a valve housing groove in combination with a circlip or snap ring.

A closing member in the form of a valve slider 37 is mounted movably with respect to piston post-slider guide 36 for sliding along the longitudinal axis of cylinder 2. Valve slider 37 is equipped on one side with a slider edge 37a. Slider edge 37a is retaining a non-magnetic spacer 42 that retains a coil wound valve contra spring 40. Valve contra spring 40 is connected to a wave spring 39. The preload on valve contra spring 40 can be adjusted by variation of the thickness of the contra spring retainer 38 and the thickness of wave spring 39.

The travel of valve slider 37 along cylinder 2 is limited by a curved spacer 41. On the other side the travel of valve slider 37 along the cylinder 2 is limited by the non-magnetic isolation spacer 42 at the side of a V-grooved side of valve slider 37.

A bypass flow throttled piston assembly 43 is fitted to piston post-slider guide 36. Assembly 43 comprises a bypass flow throttled piston 44 that is fluid flow sealed by a slight press fit of the outside diameter of piston 44 against the upper inner diameter of valve housing 32. On both flattened surfaces of bypass flow throttled piston 44, elastically deformable plates 45a and 45b are clamped by the torque applied to piston nut 70. Elastically deformable plates 45b preload a valve disk 46 on one side of bypass flow throttled piston 44. Together they form a rebound bypass flow throttle. Elastically deformable plates 45a on another side of bypass flow throttled piston 44 preload a valve disk 47. Together they form a compression bypass flow throttle.

The compression and rebound bypass flow throttles are embodiments of a restriction device restricting the flow of oil through a passage 52, 53 in bypass flow throttled piston 44. The rebound bypass flow throttle restricts the flow of oil in passage 52 during a rebound stroke whereas it substantially blocks the flow of oil in passage 52 during a compression stroke. On the other hand, compression bypass flow throttle restricts the flow of oil in passage 53 during a compression stroke whereas it substantially blocks the flow of oil in passage 53 during a rebound stroke.

The piston post-valve slider guide 36 supporting piston 7 has oil passages. Firstly, a main bypass passage 60 is bored axially. Secondly, multiple passages 61 are bored radially. Passages 61 in piston post-valve slider guide 36 are in fluid communication with ring shaped oil chamber 62 on the inside of valve slider 37, see the detailed view of valve slider 37 in FIG. 5. Passages 63 inside valve slider 37 are bored through and are in fluid communication with oil chamber 62. In the completely de-energized situation shown in FIG. 4A, valve slider 37 rests against hardened steel curved spacer 41. When piston rod 3 moves upwards in de-energized condition bypass oil flows through main bypass passage 60 to multiple passages 61 into ring shaped oil chamber 62. From ring shaped oil chamber 62, the bypass oil flows through multiple passages 63 into oil chamber 64. Oil chamber 64 is in fluid communication with compression bypass oil passage 53 on the right hand side of the bypass flow throttle piston 44. Oil in this passage elastically deforms plates 45A and opens valve disk 47. Consequently, oil is allowed to flow into oil chamber 5b. When piston rod 3 moves downwards in de-energized condition of the solenoid as part of the rebound stroke, bypass oil flows from oil chamber 5b into rebound bypass oil passage 52 of bypass flow throttled piston 44. Oil inside the rebound bypass oil passage 53 elastically deforms valve plates 45B and opens valve disk 46. Consequently, oil is allowed to flow into oil chamber 64. As oil chamber 64 is in fluid communication with multiple passages 63 inside valve slider 37, oil is allowed to flow from oil chamber 64 through multiple passages 63 into ring shaped oil chamber 62. From ring shaped oil chamber 62 on the inside of valve slider 37, rebound bypass oil flows into multiple passages 61 of the piston post-valve slider guide 36 through main bypass passage 60 into second oil chamber 5a. Throttle plates 46 and 47 constitute only a minor resistance against the upward and downward movements of the piston rod 3 at low speeds of the piston with respect of cylinder 2 so that during a de-energized solenoid condition, vertical movements are only slightly damped due to the bypass flow.

The resistance of the bypass flow, responsible for the soft set up, is very well tuneable for all different applications, vehicles and circumstances. The damper device according to this invention is so constructed that the flow rate through the bypass, over the main throttled piston, in both directions may be adjusted by increasing or decreasing the sectional opening area of the multiple oil passages 61 directly without any pilot or servo stages. This is done by moving cylindrically shaped valve slider 37 upwards to increase the flow rate through the bypass passages 61 and downwards to decrease the flow rate through the bypass passages 61. The direct character of the adjustment by cylindrically shaped valve slider 37 ensures the quickest possible damping response without the position of the cylindrically shaped valve slider 37 being influenced by exerted forces initiated by oil flow or pressure differences.

FIGS. 12A and 12B show another embodiment covered by this invention. Unlike the embodiment in FIG. 4A, valve slider 37 comprises no openings. As such, moving cylindrically shaped valve slider 37 downwards increases the flow rate through the bypass passages 61 and moving it upwards decreases the flow rate through the bypass passages 61.

Now referring to FIGS. 4A, 4B, and 12B, on top of the elastically deformable plates 45a and below elastically deformable plates 45b, hardened steel curved spacers 41 and 48 are designed in a way so that depending on the length of their smallest diameter the elastically deformable plates 45a, 45b can be preloaded more or less respectively increasing or decreasing bypass flow restriction. This allows the damping level to be adjusted prior to use of damper device 1. It is noted that all parts composing the bypass throttle valve 43 are clamped by the torque applied on the piston nut 70.

On top of main compression throttle plates 49, the main throttled piston 7 is centred by a smaller outside diameter of the piston post-valve slider guide 36 clamped by the torque applied on piston nut 70. The main throttled piston 7 is fitted moveably along the axis of cylinder 2. The outer diameter of main throttled piston 7 is oil flow sealed and guided along the inner wall of cylinder 2 by a piston ring 50 which is endlessly shrunk to throttled piston 7. On one side of main throttled piston 7, the main rebound throttle plates 51 are centred by a smaller outside diameter of piston post-valve slider guide 36 and clamped by the torque applied on piston nut 70.

Throttled piston 7 is mounted on the piston post-valve slider guide 36. As mentioned above, throttled piston 7 has a plurality of main rebound throttle plates 51 and main compression throttle plates 49 piled on both sides of throttled piston 7 and a piston ring 50 installed on the outer periphery of the piston 7, and is fitted movably along the axis of cylinder 2. Main rebound throttle plates 51 close end opening portions of rebound oil passages 7a, whereas main compression throttle plates 49 close end opening portions of compression oil passages 7b. These passages 7a, 7b are formed through the disk-like piston body. In this embodiment, rebound oil passage 7a positioned on the left hand side and is closed by main rebound throttle plates 51, while compression oil passage 7b is closed by main compression throttle plates 49. When piston rod 3 moves upwards in a state shown in FIG. 4b, as part of a compression stroke, oil in oil passage 7b elastically deforms main compression throttle plates 49 and oil is allowed to flow from the second chamber 5a into first chamber 5b. On the other hand, when piston rod 3 moves downwards, as part of a rebound stroke, oil in rebound oil passage 7a elastically deforms main rebound throttle plates 51 and oil is allowed to flow from the first chamber 5b into the second chamber 5a. That is, throttle plates 49 and 51 constitute a resistance against the upward and downward movements of piston rod 3 so that the vertical movements are damped. The resistance of the main oil flow, the firm set up, is very well tuneable for all different applications, vehicles, circumstances in both directions.

Figure 4B:
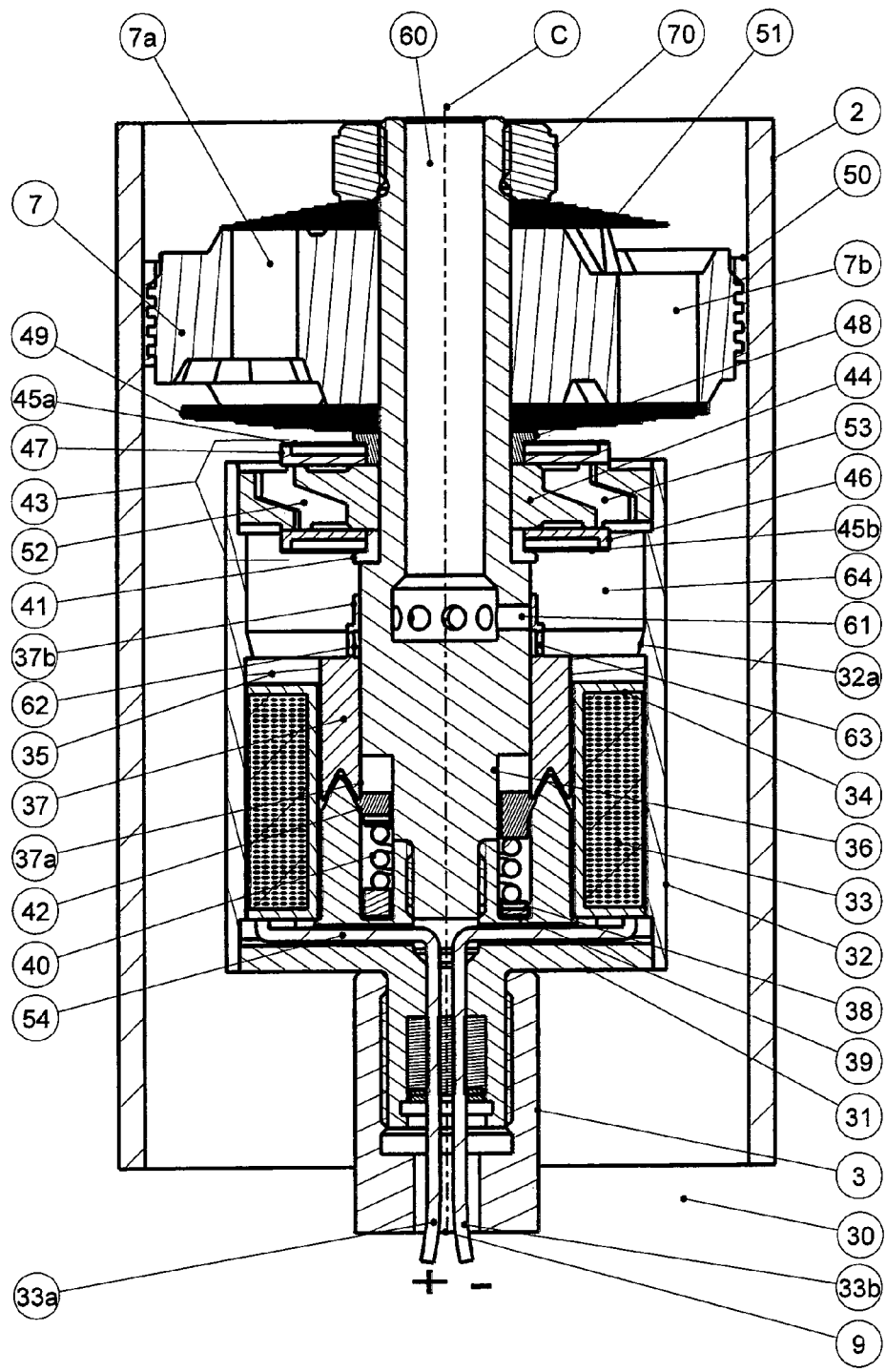
Figure 5:
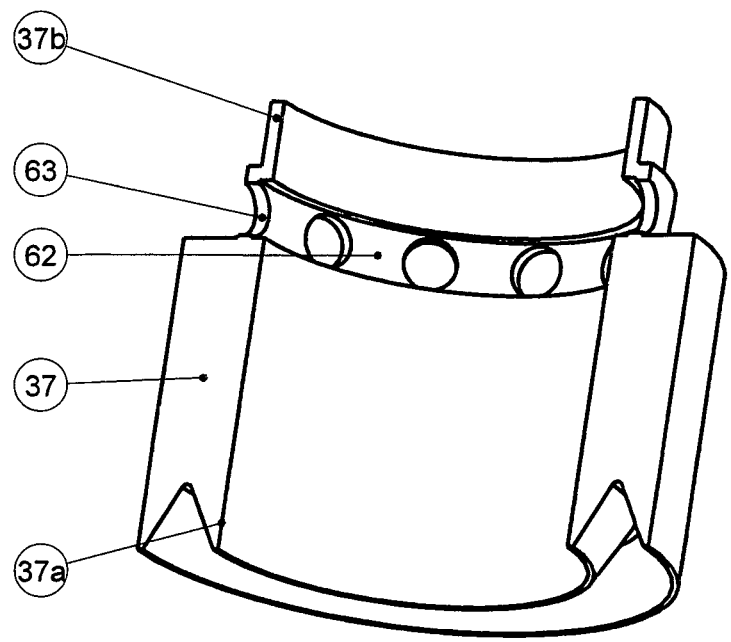
FIG. 5 shows a valve slider of the valve member of the damper device of FIG. 3.

In the embodiment shown in FIGS. 4a and 4b, valve member 30 is so constructed that cylindrically shaped valve slider 37 may be gradually moved by decreasing or increasing the magnitude of electrical current flowing through the proportional solenoid. In FIG. 4, the proportional solenoid, hereinafter referred to simply as solenoid, cooperates with a guide member that guides the magnetic field generated by the solenoid. This guide member comprises components 31, 32, 33, 35, and 37.

Together, these components form a substantially closed magnetic loop. Normally, the components have a high magnetic permeability to ensure a high magnetic induction. FIGS. 4A and 4B are an enlarged sectional view of the valve member of the damper device of FIG. 3 wherein the bypass channel is fully opened in 4A or closed in 4B.

The composite solenoid is formed by embedding an annular shaped coil 33 wound around a non-magnetic bobbin 34 in a case formed out of magnetic material and composed by valve base 31, valve housing 32, disk like spacer 35 and valve slider 37. The solenoid used in this embodiment moves valve slider 37 downwards when energized while compressing the spring device formed by valve contra spring 40 and wave spring 39 and stopped by non-magnetic isolation spacer 42. Non-magnetic isolation spacer 42 prevents direct contact between the angular edge on the upper end of valve base 31 and the V-grooved end of valve slider 37. This prevents magnetic hysteresis and the sticking of valve slider 37 to valve base 31.

When the solenoid is de-energized completely, valve slider 37 is pushed upwards by the spring device formed by valve contra spring 40 and wave spring 39 and returns to its original position defined by curved spacer 41. The reference signs 33a and 33b denote lead wires for coil 33, which run through hole 54 and hollow shaft 9 and exit shock absorber 1 at mounting eye 3a.

The guide member guides magnetic field lines in a way so that very limited magnetic energy gets lost. Components such as valve base 31, valve housing 32, disk like spacer 35 and valve slider 37, that guide magnetic field lines, are as close to coil 33 as possible. Apart from the air gap between the v-grooved end at the lower end of valve slider 37 and the curved edged upper end of valve base 31 no unnecessary magnetic resistance is to be found inside the construction of the guide member. The wall thickness of all parts guiding magnetic field lines are preferably constant and have the same radial cross sectional surface area.

By using a curved edged upper end of valve base 31 in combination with a complementary v-groove at the lower end of valve slider 37, it is achieved that the effective air gap for the magnetic field is substantially smaller than the travel of valve slider 37. The latter is determined by the movement of valve slider 37 along the axis of cylinder 2, whereas the former is determined by the shortest distance between valve base 31 and valve slider 37. This construction raises the magnetic force under all magnitudes of electrical current through the coil 33 indifferent of the position of the valve slider 37.

Another benefit of the curved edge at the upper end of the valve base 31 and the v-grooved lower end of the valve slider 37 of this invention is the fact that this construction has a strong self centring effect on the radial position of valve slider 37. No radial sideway forces are developed and valve slider 37 will therefore not be exposed to friction caused by these sideway forces resulting in accurate valve response in short periods of time. Because the magnetic force exerted on valve slider 37 is increased compared to the known damper device, a spring device with a higher spring constant can be used. The higher spring constant reduces the effects of inertia attributed to valve slider 37.

The skilled person will understand that the groove and edge can be exchanged, i.e. the v-groove arranged on valve base 31 and the curved edge arranged on valve slider 37.

FIGS. 7A-7C illustrate various embodiments of the end regions of valve slider 37 and valve base 31. In these figures, the end regions are complementary. Furthermore, for each of the figures, it holds that the vertical separation between valve slider 37 and valve base 31 is more than the shortest distance between the end regions. FIG. 7A shows the shape of the end regions of the embodiment in FIG. 4A in more detail. A similar pointed structure is depicted in FIG. 7B. FIG. 7C shows an arcuate protrusion in combination with an arcuate indentation.

FIG. 8 shows the effects of the pointed structure of FIG. 7A in a computer simulation of the magnetic induction in valve slider 37 and valve base 31 in a situation where the valve slider 37 is very near to valve base 31 and the air gap is small. Saturation can be identified in the end regions where the magnetic field is relatively high. Due to the material properties of valve slider 37 and valve base 31, magnetic saturation occurs as a result of which the increase in magnetic induction is less than what would be expected based on a constant magnetic permeability in combination with a decreasing air gap. More in particular, the magnetic reluctance attributed to the air gap strongly decreases due to the decrease in air gap length. However, this is partly compensated by the increase in the magnetic reluctance of the guide member, which in this case can be attributed to the magnetic saturation in end regions of valve slider 37 and valve base 31.

FIGS. 9A and 9B show an embodiment of a failsafe mechanism that is applied in the damper device of FIG. 3. The failsafe mechanism is based on a spring device comprising the valve contra spring 40 connected to wave spring 39, as illustrated in FIG. 10A. The spring constant of the wave spring is considerably less than that of valve contra spring 40 resulting in the spring force-displacement characteristics shown in FIG. 10B.

When the solenoid is not energized, i.e. when the current through the coil 33 drops below a low current value, for instance 0.3 to 0.4 A, wave spring 39 relieves and allows valve slider 37 to partly close the bored multiple passages 61 in the piston post-valve slider guide 36. Consequently, oil flow between first 5b and second 5a chamber is restricted. In this respect, the following can be noted. At low piston speeds, the damping force exerted by the damper is determined by the restriction devices, i.e. the compression and rebound bypass flow throttles. At high speeds, the flow resistance attributed to the partially closed passages 61 becomes relevant. The pressure drop over passages 61 depends on the flow through and dimensions of the opening allowed by valve slider 37 due to turbulence in the area close to the passages 61. At a certain piston speed, the pressure drop over the bypass equals the pressure drop over the main throttled piston and causes the oil flow to divide into a main throttled piston flow and a bypass flow.

The piston speed at which this gradual transition occurs, increases when passage 61 is covered less by valve slider 37. Consequently, in systems where passage 61 would be completely open in the absence of current to energize the solenoid, available damping forces would be limited. Such situations may occur during emergencies, for instance when the electrical wiring to drive the coil is cut. Using the failsafe mechanism it is guaranteed that a certain amount of damping is available at relatively low piston speeds. When current is absent the effective opening of passages 61 is smaller due to the de-energized position of valve slider 37.

Figure 1:
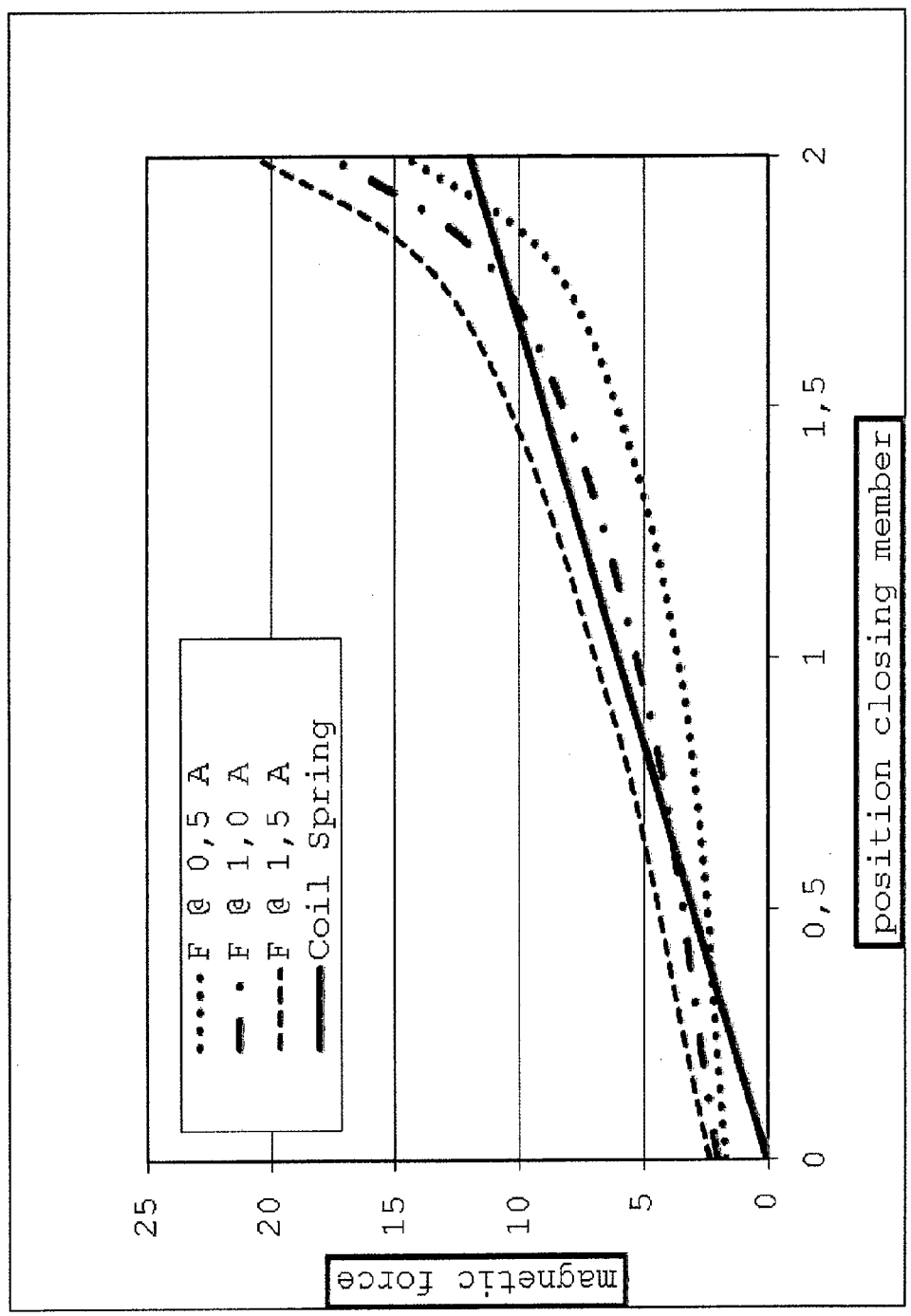
FIGS. 1 and 2 illustrate the balance between spring force and magnetic force as a function of the position of the closing member for a prior art damper device and a damper device according to the invention, respectively.
Figure 2:
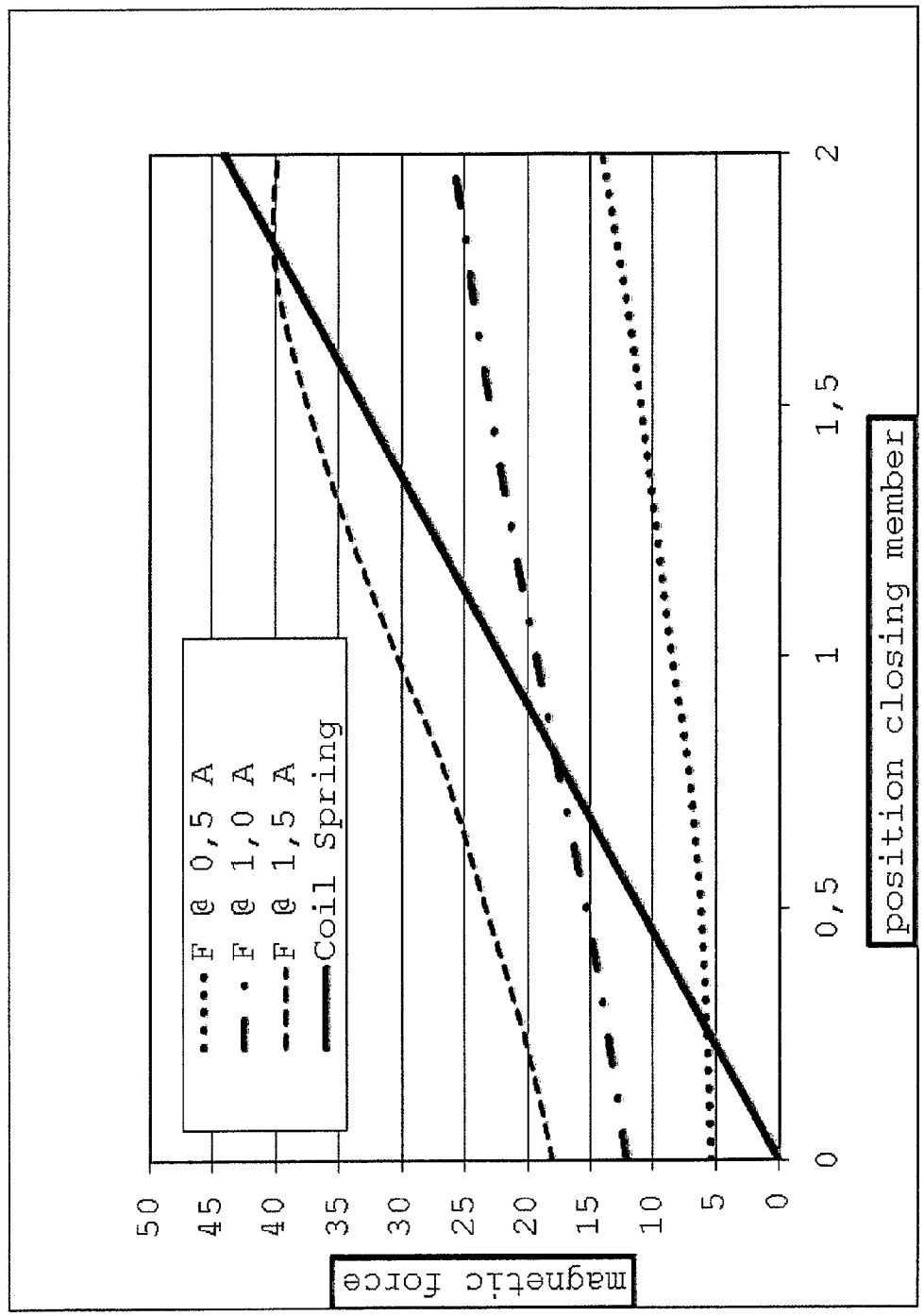

As discussed in conjunction with FIGS. 1 and 2, the position of valve slider 37 is determined by the balance between the magnetic force and the spring force exerted on valve slider 37. The position of valve slider 37 determines the restriction at passage 61 for the oil flow. It would be desirable to have a proportional control of the available damping force, meaning that the damping force would be proportional to the current through coil 33. To that end, the shape or distribution of passages 61 and or the shape or distribution of the openings in valve slider 37 may be modified such that the restriction formed at passage 61 ensures the desired proportionality.

FIG. 11A illustrates an example wherein a plurality of passages 61 is created in piston post-valve slider guide 36. The distribution of passages 61 in a direction perpendicular to the movement of slider valve 37 is preferably even. However, the density of passages differs in the direction of movement of slider valve 37. This ensures a symmetric force exerted by the oil onto slider valve 37, and it allows changing the slider position-damping force characteristics.

FIG. 11B shows an alternative embodiment wherein the variation is not implemented in the density of the openings, but in the shape of the opening itself. A plurality of these openings may be distributed evenly across the piston post-valve slider guide 36. Of course, both solutions can also be combined.

FIG. 13 shows a different embodiment of a valve member in accordance with the present invention. This valve member can be used in the damper shown in FIG. 3, wherein main bypass passage 160 is connected to throttled piston 7.

Contrary to the embodiment shown in FIGS. 4A and 4B, valve slider 137 moves within valve slider guide 136. The latter is provided with passages 161 to allow fluid communication between main bypass passage 160 and passages 152, 153.

Inside valve slider guide 136, a first spring 139 and a second spring 140 are mounted. To that end, a spring support 190 is used that is, at least during operation, in a fixed relation with respect to valve slider guide 136. A spring mounting 191 is used to couple first spring 139 to guide member part 192.

On the other end of spring 139, 140 a spring disc 193 is used that abuts both springs 139, 140. Valve slider 137 is provided with a protrusion 194 that engages spring disc 193. Furthermore, spring disc 193 is provided with a center hole to allow fluid to move around valve slider 137 to reduce pressure differences of the fluid on both ends.

Due to the pre-tensioning of springs 139, 140, spring disc 193 will push against valve slider 137 in such a manner that without energizing the electrical coils (not shown), which are mounted in spaces 133 in a manner similar to that in FIG. 4A, valve slider 137 will close passages 161. At the topside, valve slider guide 136 is provided with a protrusion 195 that limits the axial movement of valve slider 137.

Spring support 190 can be adjusted to change an axial position with respect to valve slider guide 136 thereof. In this case, spring support 190 will move through the opening of spring mounting 191 thereby changing the pre-tensioning of the second (main) spring 140 only. Consequently, the knee point in the spring-force characteristics, as shown in FIG. 10B, will shift to a lower value of displacement.

Valve housing 132, guide member part 192, valve slider 137 all have a relatively high magnetic permeability to allow a high magnetic force to be built up. However, similar to the embodiment of FIG. 4A, valve slider guide 136 is generally made of non-magnetic material, such as Aluminium or stainless steel. A drawback of these materials is that they have a different thermal expansion coefficient than the (magnetic) material of valve slider 137. This coefficient is mostly larger.

One must account for the difference in radial expansion due to heat to avoid a situation in which valve slider 137 engages valve slider guide 136 too strongly, resulting in a high coefficient of friction that would severely limit the operation of the valve.

The embodiment of FIG. 13 offers the advantage that the clearance between valve slider 137 and valve slider guide 136 will be larger under high temperatures than under normal operating conditions. Therefore, no need exists to implement a relatively large clearance at normal operating conditions to ensure proper functioning under extreme conditions with high temperatures. By having a smaller clearance under normal operating conditions, leakage of fluid can be avoided and/or reduced.

A disc 196 of magnetic material is used as a component of the magnetic loop. Sealing rings 197 and 198 prevent fluid transport to spaces 133, preventing contact between the fluid and the electrical coils.

The invention has been described using embodiments thereof. However, it should be apparent to the skilled person that modifications to these embodiments are possible without departing from the scope of the invention that is determined by the appended claims.

For instance, in FIG. 4A, a gap can be identified between valve base 31 and valve slider 37. As described before, the end regions of valve base 31 and valve slider 37 are configured such that magnetic saturation occurs when valve slider 37 approaches valve base 31. Consequently, the increase in magnetic reluctance attributed to the decrease in gap length is partly compensated by the increase in magnetic reluctance due to the magnetic saturation.

A similar effect can be obtained if valve slider 37 has a conical or tapered shape such that a further gap can be identified between disc like spacer 35 and valve slider 37. By configuring the shape of valve slider 37 such that the further gap increases when valve slider 37 moves towards valve base 31, the increase in magnetic reluctance due to the decrease of the gap length between valve slider 37 and valve base 31 is again partly compensated.

It should be apparent to the skilled person that these measures can be applied in the damper device according to the invention in isolation, or in combination.

The invention claimed is:

1. A damper device comprising:
   a cylinder with a piston that separates the cylinder in a first chamber and a second chamber, which chambers' can be filled with a hydraulic fluid;
   a bypass channel between said first and second chamber and a valve member connected thereto, said valve member comprising a coil unit for generating a magnetic field;
   a substantially closed magnetic loop for guiding the magnetic field generated by the coil unit, the magnetic loop comprising a guide member and a closing member, said closing member being moveable relative to the guide member in a first direction for opening and closing the bypass channel, said magnetic loop further comprising a first gap between the guide member and closing member for allowing said movement of the closing member;
   a spring device arranged to place the closing member under spring bias in said first direction; and
   a non-magnetic spacer arranged in the first gap and connected to the closing member and/or the guide member,
   wherein driving the coil unit generates a magnetic force acting on the closing member urging it to move against the spring bias towards the guide member thereby lowering the first gap,
   characterized in that the magnetic loop has a first magnetic reluctance attributed to the first gap and a second magnetic reluctance attributed to a remainder of the magnetic loop, wherein the magnetic loop is configured such that the second magnetic reluctance increases at least during part of the movement of the closing member towards the guide member.

2. The damper device according to claim 1, further comprising a restriction device arranged in between the bypass channel and the first or second chamber, said restriction device having a flow resistance which is significantly higher than that of the bypass channel.

3. The damper device according to claim 2, wherein said restriction device comprises a restriction channel and an elastically deformable closure connected to an end of said restriction channel, said closure being configured to at least partially open the restriction channel when fluid flows in a first restriction direction through the restriction channel towards the closure corresponding to movement of the piston in a first piston direction, and to close the restriction channel when fluid flows in a direction opposite to said first restriction direction corresponding to movement of the piston in a second piston direction opposite to the first piston direction.

4. The damper device according to claim 3, wherein said restriction device comprises a further restriction channel and a further elastically deformable closure connected to an end of said further restriction channel, said further closure being configured to at least partially open the further restriction channel when fluid flows in a second restriction direction through the further restriction channel towards the further closure corresponding to movement of the piston in the second piston direction, and to close the further restriction channel when fluid flows in a direction opposite to said second restriction direction corresponding to movement of the piston in said first piston direction.

5. The damper device according to claim 4, wherein the further closure is configured to bend away or to be pushed away by the fluid when said fluid flows in the second restriction direction through the further restriction channel towards the further closure.

6. The damper device according to claim 3, wherein the closure is configured to bend away or to be pushed away by the fluid when said fluid flows in the first restriction direction through the restriction channel towards the closure.

7. The damper device according to claim 2, wherein the restriction device comprises an element to tension and/or preload the closure or further closure in a direction towards the restriction channel or further restriction channel, respectively.

8. The damper device according to claim 2, wherein the restriction device is incorporated in the valve member.

9. The damper device according to claim 2, wherein the restriction device is connected to said bypass channel within the second chamber.

10. The damper device according to claim 1, wherein the magnetic loop is configured to magnetically saturate at least during part of the movement of the closing member towards the guide member.

11. The damper device according to claim 10, wherein the closing member just reaches a first position relative to the guide member when, during operation, a current through the coil unit equals a predefined minimum level, and wherein the closing member and the guide member each have an end region adjacent the first gap, wherein the end region of the closing member and/or the guide member has an arcuate or pointed shape such that during operation the end region displays magnetic saturation when the closing member is near or at the first position and the current level is near or at said predefined minimum level.

12. The damper device according to claim 11, wherein a spring constant of said spring device and a magnetic permeability of the magnetic loop are configured such that the spring force acting on the closing member at or near the first position roughly compensates the magnetic force acting on the closing member when the current is at said predefined minimum level.

13. The damper device according to claim 11, wherein the end region of the closing member and the end region of the guide member define a pair for which:
- one end region has an arcuate protrusion and another end region a corresponding arcuate indentation;
- one end region has a pointed structure and another end region a V-shaped groove suitable for at least partly-receiving said pointed structure; and
- one end region has a first needle like shape and another end region a second needle like shape placed offset to said first needle like shape allowing the end regions to at least partly pass each other when moving to the first position, wherein the shapes of the end regions are preferably substantially complementary.

14. The damper device according to claim 11, wherein a shape of the end regions is such that a shortest distance between the end regions is significantly smaller than a smallest distance between the end regions in the first direction.

15. The damper device according to claim 1, wherein the cylinder comprises a main elongated chamber in which the piston is arranged, said main chamber having a wall provided with a first and second opening, said first and second opening being connected to the first and second chamber, respectively, wherein the bypass channel is formed as an auxiliary elongated chamber preferably extending in parallel to said main chamber and connecting said first and second opening.

16. The damper device according to claim 15, wherein the bypass channel is at least partly formed by an auxiliary pipe member fixedly connected to the first or second opening and extending in the auxiliary chamber.

17. The damper device according to claim 16, wherein the closing member comprises a sleeve arranged inside said pipe member or said auxiliary pipe member, said damper device further comprising an axially elongated spring guide for guiding said spring device to place the closing member under spring bias.

18. The damper device according to claim 16, wherein the closing member comprises a sleeve arranged around said pipe member or said auxiliary pipe member.

19. The damper device according to claim 1, wherein the bypass channel is formed as a channel extending through the piston.

20. The damper device according to claim 19, wherein the bypass channel is at least partly formed by a pipe member fixedly connected to or integrally formed with said piston and extending in an axial direction parallel to a longitudinal axis of said cylinder, said pipe member having a through hole that enables fluid communication with the first chamber.

21. The damper device according to claim 20, wherein said pipe member is fixedly connected to or forms part of a piston rod, wherein the pipe member is preferably connected to an end of said piston rod, said piston rod preferably comprising a channel for carrying electrical wiring for said coil unit.

22. The damper device according to claim 1, wherein the closing member is configured to close the fluid passage when the coil unit is sufficiently driven.

23. The damper device according to claim 22, wherein the spring device comprises a first spring having a lower spring constant and a second spring having a higher spring constant thereby obtaining a knee point in the force-distance characteristics of said spring device, said knee point corresponding to a position of the closing member in which said fluid passage is fully open, wherein the closing member and the spring device are configured such that when the coil unit is not driven the closing member partially closes said fluid passage due to the spring bias, and wherein a force balance is achieved at a position of the closing member corresponding to said knee point using a moderate current level through the coil unit.

24. The damper device according to claim 23, wherein the first spring is fixedly mounted with respect to the pipe member, and wherein the second spring is coupled to the spring guide, said spring guide being moveable in an axial direction with respect to the pipe member or the auxiliary pipe member to adjust said knee point.

25. The damper device according to claim 1, wherein an opening or a plurality of openings of the bypass channel and/or the closing member that is to cooperate with the closing member and/or bypass channel, respectively, to obtain a variable damping force, is shaped or distributed such that a resulting damping force offered by the damper device during use is a predefined function of a current through the coil unit.

26. The damper device according to claim 25, wherein the predefined function is a substantially linear function.

27. The damper device according to claim 25, wherein said plurality of openings is distributed evenly along the circumference of the pipe member, the auxiliary member, and/or the closing member but wherein the density of openings varies along the first direction.

28. The damper device according to claim 1, wherein the magnetic loop comprises a further gap between the closing member and the guide member, said further gap increasing at least during part of the movement of the closing member towards the guide member.

29. The damper device according to claim 28, wherein the closing member has a tapered form in the first direction, and wherein the further gap is formed in a direction perpendicular to the first direction.

30. The damper device according to claim 1, wherein the coil unit comprises a solenoid.

31. The damper device according to claim 30, wherein the solenoid is essentially cylindrically shaped having a longitudinal axis extending along the first direction, and wherein said closing guide and guide member are configured such that said first gap is located approximately halfway of said solenoid in said first direction.

32. The damper device according to claim 1, wherein the piston comprises a further bypass channel for fluid communication between said first and second chamber having a flow resistance which is significantly higher than that of the opened bypass channel.

* * * * *